United States Patent

Lewis et al.

[15] 3,690,616
[45] Sept. 12, 1972

[54] PILOT-OPERATED VALVES

[72] Inventors: Donald E. Lewis, 112 Gentilly Drive; Douglas A. Biesecker, R. D. 3, both of Clarks Summit, Pa. 18411

[22] Filed: Nov. 18, 1970

[21] Appl. No.: 90,547

[52] U.S. Cl. .................................................. 251/38
[51] Int. Cl. ............................................. F16k 31/12
[58] Field of Search .................. 251/28, 30, 38, 39

[56] References Cited

UNITED STATES PATENTS

| | | | |
|---|---|---|---|
| 3,055,386 | 9/1962 | Moore | 251/28 X |
| 3,058,485 | 10/1962 | McQueen | 251/28 X |
| 3,351,316 | 11/1967 | Lewis et al. | 251/30 |

*Primary Examiner*—M. Cary Nelson
*Assistant Examiner*—David R. Matthews
*Attorney*—Howson and Howson

[57] ABSTRACT

A pilot-operated valve having a body with an inlet and an outlet and a chamber telescopically mounting a piston for displacement in alternate directions toward or away from the outlet to block or afford fluid flow through the valve is provided. The piston has an axial bore mounting ball check means and the chamber has vent means and a closure plate normally covering the vent means. A plunger connected to a valve actuator extends through an orifice in the chamber wall to engage across the bore in the piston in its forward limit position and to close the orifice in its rearward limit position. When in its forward limit position, the plunger causes the chamber to be pressurized and closes the valves. With fluid pressure applied at the inlet, the ball check vents fluid from the chamber and to the outlet to disengage the piston from the outlet and to open the valve with fluid pressure at the outlet, the ball check cooperates with the vents and closure plate to vent fluid from the chamber and to the inlet to disengage the piston from the outlet and to open the valve.

9 Claims, 5 Drawing Figures

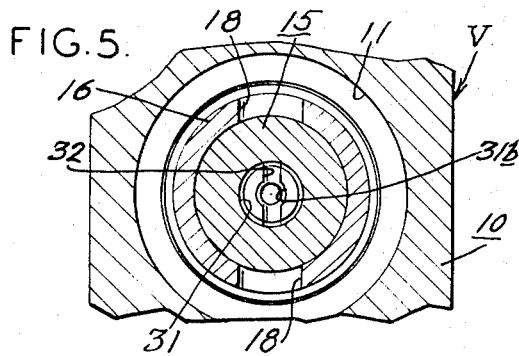
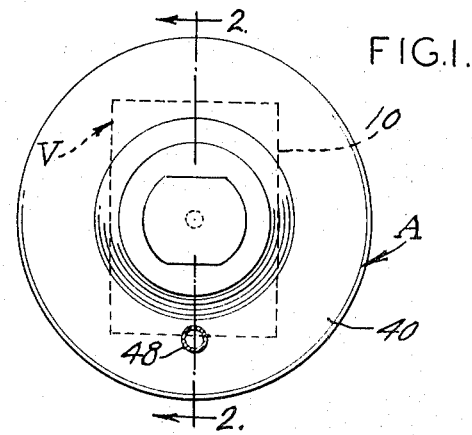
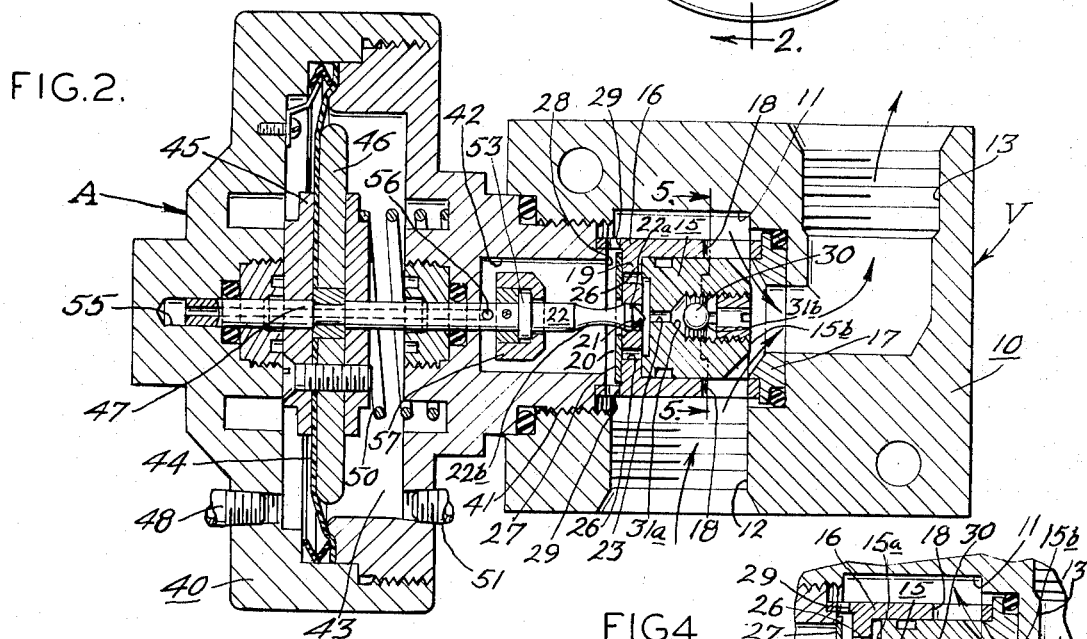
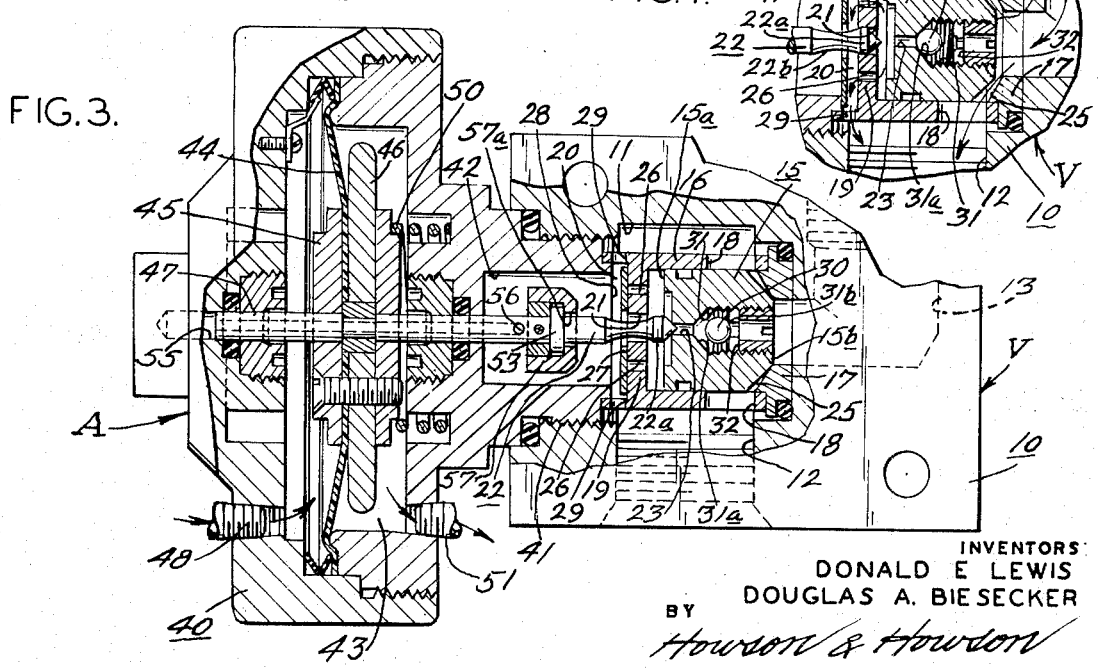
INVENTORS
DONALD E LEWIS
DOUGLAS A. BIESECKER
BY Howson & Howson
ATTYS

PILOT-OPERATED VALVES

The present invention relates to valves and more particularly, the present invention relates to pilot-operated valves which are capable of opening and closing against fluid pressure.

Valves which are operated by relatively low pilot forces have been proposed for controlling flow in fluid systems. An example of such valves is disclosed in our U.S. Pat. No. 3,351,316. In our prior patent, the valve is closed when pressure is applied in a chamber surrounding the head end of a piston and the tail end of the piston is displaced into seating engagement with the valve outlet. The valve is opened when pressure is relieved in the chamber and pressure at the valve inlet acts between the valve seat and the tail end of the piston to displace it in the opposite direction. Although our patented valve operates satisfactorily to open and close when pressure is applied at its inlet, a valve which is capable of opening and closing with pressure applied at either its inlet or outlet is highly desirable.

With the foregoing in mind, it is the primary object of the present invention to provide an improved pilot-operated valve.

As a further object, the present invention provides a unique pilot-operated valve which requires relatively low operating forces to effect a valving action.

More specifically, the present invention provides a valve having a body with an inlet and an outlet and a chamber which telescopically mounts a piston for displacement into seating engagement with the outlet to block flow through the valve when pressure is applied in the chamber. The piston has a bore providing fluid communication between the chamber and the outlet; and, check means is mounted in the bore to permit a restricted quantity of fluid to flow only from the chamber and to the outlet. Vent means is provided in the wall of the chamber to provide fluid communication between the chamber and the inlet; and closure means is associated with the vent means to permit fluid to flow from the chamber head to the inlet. An orifice is provided interiorly of the vent means and a plunger connected to a valve actuator extends into the chamber through the orifice to engage the bore in its forward limit position for pressurizing the chamber with fluid flowing thereinto through the orifice, thereby to close the valve. The valve is opened with pressure applied at the inlet when the plunger is displaced into its rearward limit position to close the orifice and the pressure displaces the piston away from the outlet with fluid in the chamber flowing through the piston and to the outlet. The valve is opened with pressure applied at the outlet when the plunger is displaced into its rearward limit position to close the orifice and the pressure displaces the piston away from the outlet with fluid in the chamber flowing through the vent means and to the inlets.

These and other objects, features and advantages of the present invention should become apparent from the following description when taken in conjunction with the accompanying drawings in which:

FIG. 1 is an end elevational view of a pilot-operated valve embodying the present invention;

FIG. 2 is an enlarged sectional view taken along line 2—2 of FIG. 1 to illustrate the valve in its open operating position with pressure applied at the valve inlet;

FIG. 3 is a fragmentary view similar to FIG. 2 but illustrating the valve in its closed operating position with pressure applied at either the valve inlet or outlet;

FIG. 4 is an enlarged fragmentary sectional view illustrating the valve in the process of being opened under the influence of fluid pressure applied at the valve outlet; and FIG. 5 is a greatly enlarged fragmentary sectional view taken along line 5—5 of FIG. 2.

Referring now to the drawings, there is illustrated in FIG. 2 a pilot-operated valve which includes a valving assembly V and an actuator assembly A. The valving assembly V comprises a valve body 10 having an interior cavity 11 with an internally threaded inlet 12 extending downwardly and outwardly of the cavity 11 and an internally threaded L-shaped outlet 13 extending upwardly and outwardly of the cavity 11. A valving action is provided in the cavity by means of a piston 15 slidably mounted inside a hollow cylindrical member 16 for engagement against a seat element 17 mounted in an annular recess surrounding the outlet 13. The member 16 has a continuous circumferential side wall in which a pair of ports 18, 18 (FIG. 5) are located diametrically adjacent the seat element 17 so as to provide fluid communication between the inlet 12 and the outlet 13. Also, the member 16 has an end wall 19 spaced from the seat element 17 and cooperating with the head end 15a of the piston 15 to form a pressure chamber 20.

The valve is closed to prevent fluid from flowing from the inlet 12 and to the outlet 13 when the chamber 20 is pressurized and the piston 15 is displaced rightward to engage its tail end 15b against the seat element 17. To this end, an orifice 21 is disposed coaxially of the piston 15 in the end wall 19 of the member 16; and an axially displaceable plunger 22 extends into the orifice 21. The plunger 22 has an enlarged portion 22a which is shaped to seat around a bore 23 extending axially through the piston 15 between the chamber 20 and the outlet 13 and which is shaped to slidably engage inside the orifice 21 to block fluid flow therethrough. The plunger 22 has a reduced portion 22b rearwardly of its enlarged portion 22a which cooperates with the orifice 21 to admit fluid into the chamber 20 when the plunger is in its forward limit position engaging in the bore 23 in the head end 15a of the piston 15. (see FIG. 3). Thus, when the plunger 22 is in its forward limit position, fluid is prevented from flowing to the outlet 13 from the chamber 20; and, the chamber 20 is pressurized causing the piston 15 to engage its seat element 17 and close the valve.

The valve is opened when the plunger 22 is displaced into its rearward limit position and pressure in the chamber 20 is relieved. Thus, fluid pressure at the inlet 12 acts in an annular wedge 25 (see FIG. 3) between the angulated surface on the tail end 15b of the piston and the seat element 17 to cause the piston to be displaced rearwardly. As the piston moves rearwardly, fluid in the chamber 20 is vented forwardly through the bore 23 and to the outlet 13. As described thus far, the valve V operates according to the teachings of our aforementioned patent which may be referred to for a more detailed description of the principles of operation of our valve structure. According to those teachings, the valve opens when a pressure differential exists across the valve inlet and outlet with the greater pressure being applied at the inlet.

According to the present invention, vent and vent closure means is provided to cooperate with check means in the bore 23 of the piston 15 to permit fluid in the chamber 20 to be flowed to the inlet 12 when the piston is being displaced rearwardly under the influence of valve-opening fluid pressure applied at the outlet 13. As may be seen in FIG. 2, the vent means comprises an array of apertures 26, 26 spaced outwardly of the orifice 21 in the end wall 19 of the member 16 and providing fluid communication between the chamber 20 and the inlet 12. The apertures 26, 26, are operatively covered by the closure means which, in the present instance, includes a thin, flat, circular plate 27 surrounding the plunger 22 and extending outwardly to span across the apertures 26, 26. Means, in the present instance, a shoulder 28 is provided to limit the displacement of the plate 27 away from the wall 19; and conduit means 29 is provided in a cylindrical rearward extension of the member 16 which extends past its end wall 19 so as to permit fluid to flow across the wall 19 and toward the orifice 21 for purposes to be described.

In the present instance, the aforementioned check means includes a check element or ball 30 mounted in an enlargement 31 in the bore 23 for displacement in alternate directions between conically-shaped seats 31a and 31b adjacent the head and tail ends 15a and 15b, respectively, of the piston. As may be seen in FIG. 5, the tail end ball seat 31b has a slot 32 extending diametrically thereacross. The slot 32 cooperates with the ball 30 to form a channel providing fluid communication in the forward direction between the chamber 20 and the outlet 13 when the ball 30 is seated thereagainst; however, when the ball 30 is engaged against the head end seat 31a, fluid communication in the opposite direction from the outlet and to the chamber is prevented.

In operation, the valve V is opened with fluid pressure applied at the inlet 12 when the plunger 22 is displaced into engagement with the head end 15a of the piston to block fluid flow through its bore 23 and hence to cause fluid to flow through the conduit means 29 and the orifice 21 and into the chamber 20. Fluid flowing between the closure plate 27 and the wall 19 causes the plate 27 to engage the wall 19 and thereby closes the apertures 26, 26. In addition some fluid flows into the portion of the cavity 11 rearwardly of the plate 27 to maintain the plate engaged across the apertures while the chamber 20 is being pressurized and the piston 15 is being displaced against the seat element 17.

When it is desired to open the valve with fluid pressure applied at the inlet 12, the plunger 22 is displaced into its rearward limit position closing the orifice 21. Fluid pressure acting in the wedge zone 25 between the tail end 15b of the piston and the seat 17 causes the piston to move rearwardly. As the piston moves rearwardly, the ball 30 engages the tail end seat 31a and, the channel provided between the ball 30 and the seat 31b permits fluid in the chamber 20 to vent forwardly into the outlet 13.

When it is desired to open the valve with fluid pressure applied at the outlet 13, the plunger 22 is displaced into the rearward limit position (FIG. 4). Fluid pressure acts directly on the tail end 15b of the piston 15 and on the ball 30 in the bore 22 to cause the piston 15 to move rearwardly and to cause the ball 30 to seat against its head end seat 31a. Rearward displacement of the piston 15 causes the fluid in the chamber 20 to displace the closure plate 27 into its rearward limit position for permitting fluid to flow through the apertures 26, 26 and the conduit means 29 into the inlet 12 (see FIG. 4). When it is desired to close the valve with fluid pressure at the outlet 13 greater than fluid pressure at the inlet 12, the plunger 22 is moved toward its forward limit position by the valve actuator A. Movement of the plunger toward its forward limit position will cause the plunger 22 to engage the bore 23 of the piston 15 forcing the piston 15 forwardly into engagement with the valve seat 17. Thus, with reverse flow through the valve, the valve is closed without being used as a pilot-operated valve but to the contrary, is closed directly by force of the valve actuator A. In this application, operation of the valve is limited by the amount of force that can be exerted on the piston 15 by the valve actuator.

In accordance with another object of the present invention, relatively low pilot forces are required to cause the valve V to effect a valving action. To this end, the actuator A has a housing 40 with an internally threaded boss 41 and a recess 42 interiorly of the boss which surrounds the plunger 22 to form a continuation of the cavity 11 in the valve body 10 when the actuator A is threadedly engaged with the valve V. The housing 40 forms a diaphragm chamber 43 in which a diaphragm 44 is mounted for flexure in a plane normal to the path of movement of the plunger 22. As may be seen in FIG. 2, the diaphragm 44 is sandwiched between plates 45 and 46 which are connected intermediate the ends of a stem 47 forming a rearward extension of the plunger 22. Thus, flexure of the diaphragm 44 rightward upon admission of a relatively low pressure medium into the left side of the chamber 43 through an inlet 48 (FIG. 2) causes the stem 47 and hence the plunger 22 to be displaced rightward into their forward limit position for closing the valve. In the present instance, the diaphragm is biased leftward by means of a compression spring 50 mounted in the right side of the chamber 43; hence, the valve V is normally open. However, if a normally closed valve V is desired, spring 50 may be disposed in the left side of the chamber 43 and the pressure required to flex the diaphragm may be admitted to the right side of the chamber 43 through a pipe 51 which provides the ambient pressure vent in the illustrated embodiment.

For the purpose of balancing the forces required to displace the plunger 22 axially the actuator housing 40 telescopically receives one end of the stem 47 and cooperates therewith to form a compartment 55. The other end of the stem 47 extends into the recess 42. The stem 47 is hollow along a major portion of its length and has a lateral port 56 located in the recess 42, thereby providing fluid communication between the cavity 11 and the compartment 55. As a result, pressure in the recess 42 is applied in the compartment 55 and acts rightward on the end of the stem 47 to counterbalance the effect of the pressure acting leftward on the end of the plunger 22.

In order to ensure proper alignment of the plunger 22 with the orifice 21 during axial displacement of the enlarged portion of the plunger 22 into and out of the engagement therein, means is provided to couple the plunger 22 to the stem 47 so as to permit limited transaxial displacement of the plunger 22 relative to the stem. In the illustrated embodiment, the coupling means comprises a peripheral flange 53 on the rearward end of the plunger 22 and a hollow cap 57 mounted on the forward end of the stem 47 forwardly of the lateral port 56 for instance by means of a pinned connection. The cap 57 has an axial bore 57a which is sized larger than the diameter of the plunger 22 but smaller than the diameter of the flange 53. Thus, the plunger 22 is capable of aligning itself with the orifice 21.

In view of the foregoing, it should be apparent that an improved pilot-operated valve has now been provided. Also, a pilot-operated valve which is capable of being operated by relatively low pilot forces has also been provided.

While a preferred embodiment of the present invention has been described in detail, various modifications, alterations or changes may be made without departing from the spirit and scope of the present invention as defined in the appended claims.

We claim:

1. In a valve, comprising: a valve body having a cavity and means providing an inlet and an outlet for said cavity, a piston mounted in said cavity for displacement in alternate directions between a forward limit position engaging one end against said body around said outlet to block fluid flow through the valve and a rearward limit position spacing said one end from said outlet to afford fluid flow through said outlet, a wall confronting the other end of said piston and cooperating therewith to define a fluid expansion chamber to cause forward displacement of said piston upon the introduction of pressure fluid into said chamber, bore means affording fluid flow through said piston between said chamber and said outlet, an orifice providing a first fluid flow passage between said inlet and said chamber, a plunger extending through said orifice and mounted for displacement in said chamber between a forward limit position engaging said other end of said piston around said bore means to block fluid flow therethrough and a rearward limit position engaging said wall around said orifice to block fluid flow through said first flow passage into said chamber, said plunger having a reduced portion cooperating with said orifice when in its forward position to admit fluid to the chamber, the improvement comprising: vent means in said wall affording a second fluid flow passage between said inlet and said chamber, check means mounted in said bore means permitting fluid flow from said chamber and to said outlet and preventing fluid flow in the opposite from said outlet and to said chamber, closure means mounted in said cavity and adjacent said wall for displacement away from said wall to permit fluid to flow through said vent means and to said inlet when said piston is being displaced in said opposite direction, whereby the piston is displaced into seating engagement with the outlet when the plunger engages across the bore means and fluid is flowed into the chamber through the orifice and the piston is displaced out of seating engagement with the outlet when the plunger is disengaged from the bore means and a fluid pressure differential is applied between the inlet and the outlet.

2. Apparatus according to claim 1 wherein said vent means includes a plurality of apertures extending through said wall and located outwardly of said orifice and said vent closure means includes a plate mounted in said cavity on the side of said wall opposite said chamber, said plate surrounding said plunger and extending outwardly across said apertures, and including shoulder means located in said cavity a spaced distance from said side of the wall to engage said plate for limiting its displacement away from said wall during displacement of the piston in said opposite direction.

3. Apparatus according to claim 2 including conduit means providing a fluid flow passage between said inlet and said vent means and orifice, said conduit means being located intermediate said side of the wall and said shoulder means so as to cause fluid flowing from said inlet and across said side of the wall to displace said plate against said side of the wall for closing said apertures.

4. Apparatus according to claim 1 wherein said check means includes an enlargement in said bore means intermediate said piston ends, a check element mounted in said enlargement for displacement in alternate directions axially of the piston, the end of said enlargement adjacent said other end of the piston being shaped to engage said check element and prevent fluid flow to said chamber from said outlet and the end of said enlargement adjacent said one end of the piston being shaped to engage said check element and cooperate therewith to define a channel permitting fluid flow from said chamber and to said outlet.

5. Apparatus according to claim 4 wherein said check element includes a ball and the ends of said enlargement each have a conical shape to engage said ball with said one end of said enlargement having a transverse slot confronting said ball and cooperating therewith when the ball is seated thereagainst to define said fluid flow channel.

6. Apparatus according to claim 1 including an actuator mounted to said valve body, said actuator having a stem extending substantially coaxially with said plunger, and including means coupling said plunger to said stem to permit limited transaxial displacement of said plunger relative to said stem, whereby the plunger is self-aligning with respect to the orifice in the wall.

7. Apparatus according to claim 6 wherein said plunger has a periphery flange on the end adjacent said stem and said plunger coupling means includes a cap surrounding said flange and mounted on said stem, said cap having an aperture smaller than the flange on said plunger and larger than said plunger forwardly of said flange to permit limited transaxial displacement of said plunger relative to said stem.

8. Apparatus according to claim 6 wherein said stem is hollow and extends into said cavity and has a port located rearwardly of said coupling means in said cavity to provide fluid communication between said cavity and the interior of said stem, and said actuator surrounds the uncoupled end of said stem and cooperates therewith to define a compartment, so that pressure fluid communicated to the compartment from the valve cavity operates to equalize the pressure axially of the actuator stem to balance the forces required to operate the valve.

9. Apparatus according to claim 6 wherein said actuator includes a diaphragm chamber surrounding said stem intermediate its ends and a diaphragm mounted in said chamber for flexure upon admission of pressure to one side thereof in said chamber, and including means connecting said diaphragm to said stem intermediate its ends for displacing said stem upon flexure of said diaphragm.

* * * * *